(12) United States Patent
Shi et al.

(10) Patent No.: US 10,554,109 B2
(45) Date of Patent: Feb. 4, 2020

(54) LINEAR VIBRATION MOTOR

(71) Applicant: GOERTEK.INC, Weifang, Shandong (CN)

(72) Inventors: Dezhang Shi, Weifang (CN); Yueguang Zhu, Weifang (CN)

(73) Assignee: GOERTEK.INC, Weifang, Shandong (CN)

( * ) Notice: Subject to any disclaimer, the term of this patent is extended or adjusted under 35 U.S.C. 154(b) by 113 days.

(21) Appl. No.: 15/553,026

(22) PCT Filed: Dec. 26, 2016

(86) PCT No.: PCT/CN2016/112116
§ 371 (c)(1),
(2) Date: Aug. 23, 2017

(87) PCT Pub. No.: WO2018/036054
PCT Pub. Date: Mar. 1, 2018

(65) Prior Publication Data
US 2018/0248457 A1 Aug. 30, 2018

(51) Int. Cl.
*H02K 33/02* (2006.01)
*F16F 1/36* (2006.01)

(52) U.S. Cl.
CPC ............... *H02K 33/02* (2013.01); *F16F 1/36* (2013.01); *F16F 2224/02* (2013.01)

(58) Field of Classification Search
CPC ........ H02K 33/02; H02K 33/16; H02K 33/18; F16F 1/36; F16F 2224/02; B06B 1/045
See application file for complete search history.

(56) References Cited

U.S. PATENT DOCUMENTS

| 2011/0018364 | A1* | 1/2011 | Kim | H02K 33/18 310/17 |
| 2011/0115310 | A1* | 5/2011 | Dong | H02K 33/16 310/28 |
| 2011/0115311 | A1* | 5/2011 | Dong | H02K 33/16 310/28 |
| 2011/0280433 | A1* | 11/2011 | Park | H02K 33/16 381/433 |
| 2016/0013710 | A1* | 1/2016 | Dong | H02K 33/16 310/25 |

FOREIGN PATENT DOCUMENTS

CN 204425166 U * 6/2015

* cited by examiner

Primary Examiner — Jue Zhang

(57) ABSTRACT

Disclosed is a linear vibration motor, comprising a housing, a vibration assembly and a stator assembly, wherein the vibration assembly includes a mass block, a permanent magnet and an elastic sheet and the stator assembly includes a coil and a damping element; the damping element includes a main body and an elastic arm extending upwards from the main body, and the main body is fixed on an end of the mass block in the length direction; and the elastic sheet has a middle arm and a first connection arm and a second connection arm respectively provided at two ends of the middle arm, the surface of the middle arm adjacent to the mass block is abutted against the elastic arm, the first connection arm is fixedly connected to the housing, and the second connection arm is fixedly connected to the mass block.

10 Claims, 2 Drawing Sheets

LINEAR VIBRATION MOTOR

CROSS REFERENCE TO RELATED APPLICATION

This application is a national stage application, filed under 35 U.S.C. § 371, of International Application No. PCT/CN2016/112116, filed on Dec. 26, 2016, which claims priorities to Chinese Application No. 2016107172440 filed on Aug. 24, 2016, the content of which is hereby incorporated by reference in its entirety.

TECHNICAL FIELD

The present invention relates to the field of vibration devices, and in particular to a linear vibration motor.

BACKGROUND ART

With the development of communication technologies, portable electronic products such as mobile phone, handheld game player or handheld multimedia entertainment device are more and more popular. In order to facilitate realizing interaction between human and portable electronic products, linear vibration motors are usually adopted to realize functions such as incoming call prompt for mobile phones, vibration feedback for game players, and the like. However, with the improvement of the performance requirements of portable electronic products, the performance requirements to various internal components are also increased, without exception of linear vibration motors.

The conventional linear vibration motor usually includes a housing, a vibration assembly and a stator assembly, wherein the vibration assembly usually consists of a mass block, a permanent magnet and an elastic sheet. The stator assembly usually consists of an FPCB, a damping element, a stopper block and a coil. The damping element functions to control the vibration magnitude and vibration response speed of the linear vibration motor. In particular, the housing is provided with a sealed accommodation space where the vibration assembly and the stator assembly are both located. After the coil is energized, the permanent magnet drives the elastic sheet and the mass block to perform reciprocate and regular vibrations under the action of an electromagnetic push force, thus realizing the vibration function of the linear vibration motor.

The conventional damping element is usually magnetic liquid provided on the mass block. Since the damping function of the magnetic liquid is affected by the volume of the magnetic liquid and the distribution state of the magnetic liquid and it is difficult to control the magnetic liquid with strong mobility during production, the linear vibration motor using magnetic liquid as the damping element has a low yield. Also, the magnetic liquid is easy to fail after the linear vibration motor goes through reliability test such as collision test or drop test, which severely affects the vibration response performance of the linear vibration motor.

Contents of Invention

An object of the present invention is to provide a new solution of a linear vibration motor to simplify the assembly procedure of damping elements, improve the yield of linear vibration motors and prevent damping elements from failure due to the reliability test of linear vibration motors.

According to a first aspect of the present invention, a linear vibration motor is provided, comprising a housing, a vibration assembly and a stator assembly, wherein the vibration assembly includes a mass block, a permanent magnet and an elastic sheet and the stator assembly includes a coil and a damping element; the damping element includes a main body and an elastic arm extending from the main body, and the main body is fixed on an end of the mass block in the length direction; and the elastic sheet has a middle arm and a first connection arm and a second connection arm respectively provided at two ends of the middle arm, the surface of the middle arm adjacent to the mass block is abutted against the elastic arm, the first connection arm is fixedly connected to the housing, and the second connection arm is fixedly connected to the mass block.

Alternatively, the main body is sleeved on an end of the mass block in the length direction.

Alternatively, the mass block is provided with a positioning groove at least partially mating with the main body.

Alternatively, the elastic arm extends in the direction away from the mass block, and the surface of the elastic sheet away from the mass block is adhered to the surface of the middle arm adjacent to the mass block.

Alternatively, there are two damping elements and the two damping elements are respectively provided at two ends of the mass block in the length direction.

Alternatively, the housing includes an upper housing and a lower housing, the coil is fixed on the upper housing, and the first connection arm is fixedly connected to the upper housing.

Alternatively, the stator assembly also includes a limit block fixedly connected to the lower housing to limit the vibration travel of the vibration assembly.

Alternatively, the surface of the middle arm corresponding to the limit block is a slope surface to avoid the collision of the elastic sheet with the limit block during vibration.

Alternatively, the vibration assembly also includes a Washer plate provided on one side of the mass block which is embedded with the permanent magnet, and the Washer plate is fixedly connected to the housing and/or the mass block.

Alternatively, the material of the damping element is silica.

The inventors of the present invention have found that in the prior art there are indeed problems that the yield of the linear vibration motor is low and the magnetic liquid is easy to fail. Thus, the technical task to be realized by the present invention or the technical problem to be solved has never been contemplated or predicted by those skilled in the art, so the present invention is a new technical solution.

A beneficial effect of the present invention lies in that the elastic arm of the damping element provides an elastic force to the elastic sheet through the middle arm abutted against the elastic arm when the linear vibration motor vibrates to realize damping effects. Different from the existing magnetic liquid, this damping element is simple to assemble, easy to control the assembly procedure, and can effectively improve the yield of the linear vibration motor. The damping element in the present invention will not fail due to reliability test and can effectively ensure the vibration response performance of the linear vibration motor.

The other features and advantages of the present invention will become clear according to the detailed description of exemplary embodiments of the present invention with reference to the accompanying drawings.

DESCRIPTION OF FIGURES

The accompanying drawings incorporated in the description and constituting a part of the description illustrate the embodiments of the present invention and used to explain the principle of the present invention along therewith.

Figure 1:
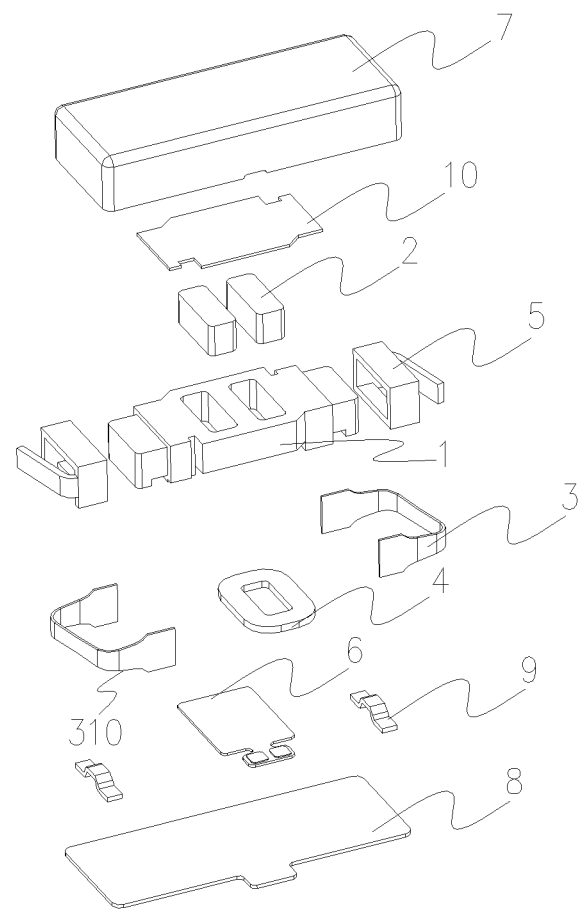
FIG. 1 is an exploded view of a linear vibration motor according to an embodiment of the present invention.
Figure 2:
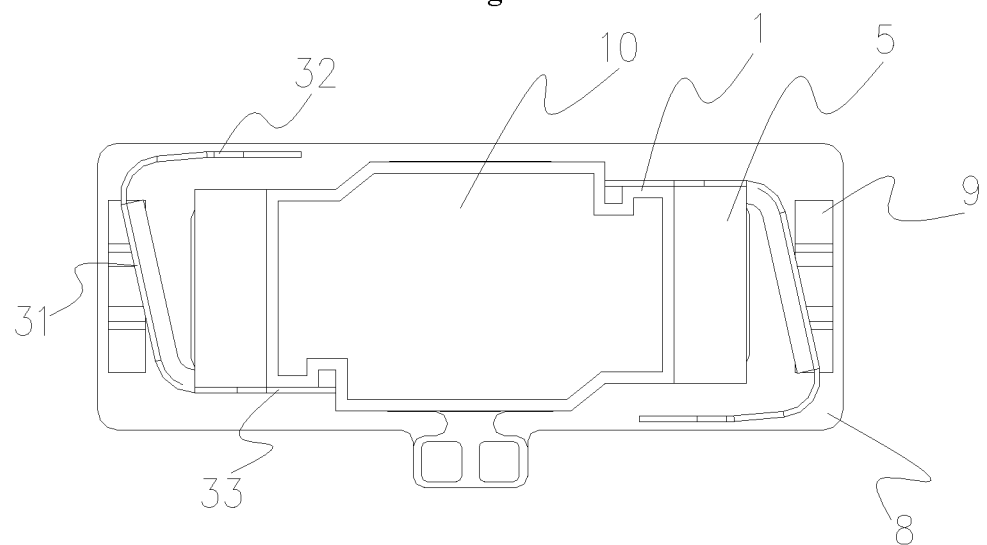
FIG. 2 is a structure view of a linear vibration motor with an upper housing hidden according to an embodiment of the present invention.
Figure 3:
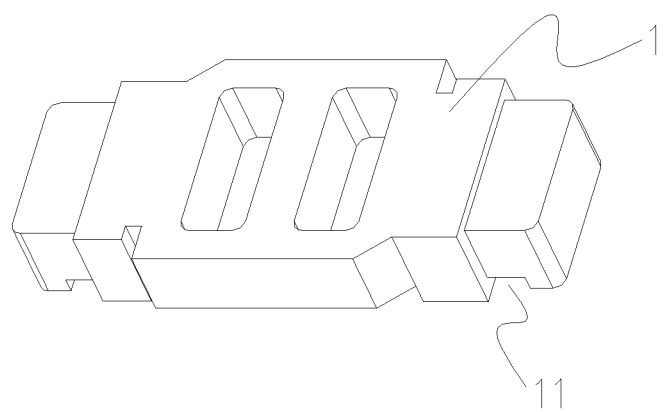
FIG. 3 is a structure view of a mass block of a linear vibration motor according to an embodiment of the present invention.

REFERENCE SIGNS mass block—1, positioning groove—1, permanent magnet—2, elastic sheet—3, middle arm 31, slope surface—310, first connection arm—32, second connection arm—33, coil—4, damping element—5, main body—51, elastic arm—52, FPCB—6, upper housing—7, lower housing—8, limit block—9, Washer plate—10.

Specific Mode for Carrying Out the Invention

Various exemplary embodiments of the present invention will be described in detail with reference to the accompanying drawings. It should be noted that unless stated specifically otherwise, the relative arrangement of the components and steps illustrated in these embodiments, the numeral expressions and the values do not limit the scope of the present invention.

The description of at least one exemplary embodiment of the present invention is actually merely illustrative rather than limiting the present invention and the application or use thereof.

Technologies, methods and devices known to those skilled in the art may not be described in detail but these technologies, method and device shall be regarded as a part of the description when appropriate.

Any particular value in all examples illustrated and described here shall be construed as merely illustrative rather than limiting. Thus, other examples of the exemplary embodiments may have different values.

It should be noted that similar signs and letters represent similar items in the following figures, and thus, once a certain item is defined in a figure, there is no need to further describe the same in the following figures.

In order to solve the problem that the linear vibration motor has a low yield and the magnetic liquid is easy to fail, the present invention provides a linear vibration motor. As shown in FIGS. 1 to 4, the linear vibration motor includes a housing, a vibration assembly and a stator assembly. It should be clear to those skilled that the housing is provided with a sealed accommodation space where the vibration assembly and the stator assembly are both located. The vibration assembly includes a mass block 1, a permanent magnet 2 and an elastic sheet 3. The stator assembly includes a coil 4 and a damping element 5. The permanent magnet 2 is usually fixed on the mass block in an embedded manner. The typical structure of the stator assembly may further include an FPCP (flexible printed circuit board) providing a current to the coil 4. The damping element 5 includes a main body 51 and an elastic arm 52 extending from the main body 51. The main body 51 is fixed on an end in the length direction of the mass block 1. The fixation of the main body 51 on the mass block 1 may be realized in a well-known manner in the art, such as adhesion or snap-fit or sleeving. The elastic arm 52 refers to an arm structure which has elasticity and may provide an elastic force to a component adhered thereto or abutted therewith. The material of the elastic arm 52 may be chosen flexibly according to the actual needs. Of course, the material of the damping element 5 may also be configured according to actual needs, such as silica or plastic. The elastic sheet 3 has a middle arm 31 and a first connection arm 31 and a second connection arm 33 provided at two ends of the middle arm 31 respectively. The surface of the middle arm 31 adjacent to the mass block 1 is abutted against the elastic arm 52. That is, the elastic arm 52 provides an elastic force to the elastic sheet 3 through the middle arm 31. The first connection arm 32 is fixedly connected to the housing. The second connection arm 33 is fixedly connected to the mass block 1. It would readily contemplated by those skilled in the art that the elastic sheet 3 is preferably of a U-shape. The above fixed connection may be realized by means of welding or gluing, preferably, welding.

The linear vibration motor in the present invention is especially suitable for portable electronic products, such as mobile phones. The vibration process is as follows: after the coil 4 is energized, the permanent magnet 2 drives the elastic sheet 3 and the mass block 1 to perform reciprocate and regular vibration under the action of an electromagnetic push force. The damping element 5 located between the elastic sheet 3 and the mass block 1 functions to control the vibration magnitude and vibration response speed of the linear vibration motor during the above regular vibration.

The elastic arm 52 of the damping element 5 in the present invention provides an elastic force to the elastic sheet 3 through the middle arm 31 abutted against the elastic arm 52 when the linear vibration motor vibrates to realize damping effects. Different from the existing magnetic liquid, this damping element is simple to assemble, easy to control the assembly procedure, and can effectively improve the yield of the linear vibration motor. The damping element 5 in the present invention will not fail due to reliability test and can effectively ensure the vibration response performance of the linear vibration motor. In addition, according to different damping demands, the damping element 5 in the present invention can adjust the damping magnitude by adjusting the material and size of the damping element 5. Especially, the damping magnitude can be adjusted by adjusting the magnitude of the elastic force provided by the elastic arm 52 to the elastic sheet 3.

The damping element 5 made of a flexible material in the present invention is located between the middle arm 31 of the elastic sheet 3 and the mass block 1 when the linear vibration motor vibrates. Different from the existing magnetic liquid, this damping element is an integral block structure, simple to assemble, easy to control the assembly procedure, and can effectively improve the yield of the linear vibration motor. The damping element in the present invention will not fail due to displacements caused by reliability test and can effectively ensure the vibration response performance of the linear vibration motor.

Alternatively, the main body 51 may be sleeved on an end of the mass block 1 in the length direction.

Figure 4:
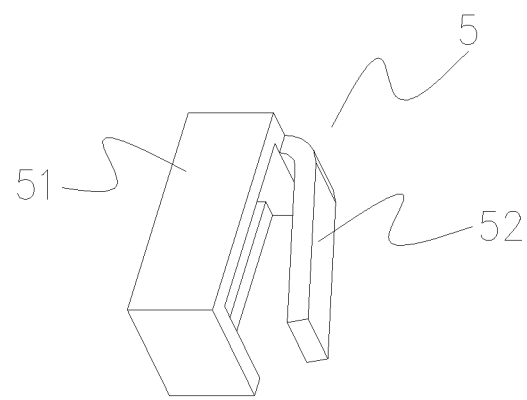
FIG. 4 is a structure view of a damping element of a linear vibration motor according to an embodiment of the present invention.

In a preferred embodiment of the present invention, the mass block 1 is provided with a positioning groove 11 at least partially mating with the main body 51 to realize the purpose of fixing the damping element 5 on the mass block 1. The portion mating with the positioning groove 11 may be a structure such as bump on the main body 51. Alternatively, as shown in FIGS. 1 and 4, the main body 51 is of a rectangular shape sleeving on an end in the length direction of the mass block 1. One side of the main body 51 mates with the positioning groove 11 on the surface of the mass block 1 so as to fix the damping element 5 on the mass block 1.

In another preferred embodiment of the present invention, the elastic arm 52 extends along the direction away from the mass block 1. The surface of the elastic arm away from the mass block 1 is adhered to the surface of the middle arm 31 adjacent to the mass block 1. This mating between the elastic arm 52 and the middle arm 31 is beneficial for the elastic arm 52 to provide a bigger elastic force to the elastic sheet 3.

In order to improve the vibration stability of the linear vibration motor, there are two damping elements 5. The two damping element 5 are provided at two ends in the length direction of the mass block 1. Of course, it would be clear to those skilled in the art shall that in this embodiment, there are also two elastic sheets 3 corresponding to the two damping elements 5 respectively. The two elastic sheets 3 are both preferably of a U-shape.

In another preferred embodiment of the present invention, the housing includes an upper housing 7 and a lower housing 8. The coil 4 is fixed on the lower housing 8. The first connection arm 32 is fixedly connected to the upper housing 7. The fixed connection can be realized by means of welding or gluing, preferably, welding.

Alternatively, the stator assembly in the present invention may also include a limit block 9 fixedly connected to the lower housing 8 to limit the vibration travel of the vibration assembly. The fixed connection can be realized by means of welding or gluing. Also, the limit block 9 can be arranged symmetrically in the length direction of the mass block 1 to limit the vibration travel of the vibration assembly in the direction perpendicular to the lower housing 8 more effectively.

In order to prevent the elastic sheet 3 colliding with the limit block 9 during vibration and causing abnormal sound, the surface of the middle arm 31 corresponding to the limit block 9 is a slope surface 310 to avoid the elastic sheet 3 from colliding with the limit block 9 during vibration. Those skilled in the art can configure the inclination angle of the slope surface 310 according to the particular shapes of the mass block 1 and the limit block 9 and the relative position relationship therebetween.

Alternatively, the vibration assembly may also include a Washer plate 9 provided on one side of the mass block 1 which is embedded with the permanent magnet 2. The Washer plate 9 is fixedly connected to the housing and/or the mass block 1. The fixed connection can be realized by means of welding. The Washer plate 9 can function to be magnetically conductive, fix the permanent magnet 2 and correct the magnetic flux of the permanent magnet 2.

The material of the damping element 5 can be configured according to actual needs. Preferably, the material of the damping element 5 is silica.

Although some specific embodiments of the present invention have been described in detail by way of example, it should be understood by those skilled in the art that the above examples are merely for the sake of description rather than limiting the scope of the present invention. It should be understood by those skilled that the above embodiments may be modified without departing from the scope and spirit of the present invention. The scope of the present invention is limited by the appended claims.

The invention claimed is:

1. A linear vibration motor, comprising a housing, a vibration assembly and a stator assembly, wherein the vibration assembly includes a mass block, a permanent magnet and an elastic sheet and the stator assembly includes a coil and a damping element; the damping element includes a main body and an elastic arm extending from the main body in the direction away from the mass block, and the main body is fixed on an end of the mass block in the length direction, the elastic arm is configured to be an arm structure which has elasticity and provides an elastic force to a component adhered thereto or abutted therewith; and the elastic sheet has a middle arm and a first connection arm and a second connection arm respectively provided at two ends of the middle arm, the surface of the middle arm adjacent to the mass block is abutted against the elastic arm, the first connection arm is fixedly connected to the housing, and the second connection arm is fixedly connected to the mass block.

2. The linear vibration motor according to claim 1, wherein the main body is sleeved on an end of the mass block in the length direction.

3. The linear vibration motor according to claim 1, wherein the mass block is provided with a positioning groove at least partially mating with the main body.

4. The linear vibration motor according to claim 1, wherein the surface of the elastic sheet away from the mass block is adhered to the surface of the middle arm adjacent to the mass block.

5. The linear vibration motor according to claim 1, wherein there are two damping elements and the two damping elements are respectively provided at two ends of the mass block in the length direction.

6. The linear vibration motor according to claim 1, wherein the housing includes an upper housing and a lower housing, the coil is fixed on the lower housing, and the first connection arm is fixedly connected to the upper housing.

7. The linear vibration motor according to claim 6, wherein the stator assembly also includes a limit block fixedly connected to the lower housing to limit the vibration travel of the vibration assembly.

8. The linear vibration motor according to claim 7, wherein the surface of the middle arm corresponding to the limit block is a slope surface to avoid the collision of the elastic sheet with the limit block during vibration.

9. The linear vibration motor according to claim 1, wherein the vibration assembly also includes a Washer plate provided on one side of the mass block which is embedded with the permanent magnet, and the Washer plate is fixedly connected to the housing and/or the mass block.

10. The linear vibration motor according to claim 1, wherein the material of the damping element is silica.

* * * * *